United States Patent
Liu et al.

(10) Patent No.: US 9,437,342 B2
(45) Date of Patent: Sep. 6, 2016

(54) METHOD FOR PREPARING SILVER-BASED ELECTRICAL CONTACT MATERIAL

(71) Applicant: Schneider Electric Industries SAS, Rueil-Malmaison (FR)

(72) Inventors: Nan Liu, Shanghai (CN); Binyuan Zhao, Shanghai (CN); Yijian Lai, Shanghai (CN)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 0 days.

(21) Appl. No.: 14/389,444

(22) PCT Filed: Mar. 29, 2013

(86) PCT No.: PCT/CN2013/073513
§ 371 (c)(1),
(2) Date: Sep. 30, 2014

(87) PCT Pub. No.: WO2013/143500
PCT Pub. Date: Oct. 3, 2013

(65) Prior Publication Data
US 2015/0083974 A1    Mar. 26, 2015

(30) Foreign Application Priority Data
Mar. 30, 2012 (CN) .......................... 2012 1 0090731

(51) Int. Cl.
| | |
|---|---|
| *H01B 1/02* | (2006.01) |
| *C01B 31/00* | (2006.01) |
| *H01B 1/04* | (2006.01) |
| *C01B 31/06* | (2006.01) |

(Continued)

(52) U.S. Cl.
CPC . *H01B 1/04* (2013.01); *B22F 1/02* (2013.01); *B22F 9/24* (2013.01); *C01B 31/06* (2013.01);

(Continued)

(58) Field of Classification Search
CPC ............ H01B 1/00; H01B 1/02; H01B 1/04; C01B 31/06
See application file for complete search history.

(56) References Cited

U.S. PATENT DOCUMENTS

| | | | |
|---|---|---|---|
| 2003/0138698 A1* | 7/2003 | Lee et al. ................... | 429/231.8 |
| 2011/0223322 A1* | 9/2011 | Rudhardt et al. ............. | 427/125 |
| 2013/0313490 A1* | 11/2013 | Eiden et al. .................. | 252/514 |

FOREIGN PATENT DOCUMENTS

| | | |
|---|---|---|
| CN | 1396025 | 2/2003 |
| CN | 1421477 | 6/2003 |

(Continued)

OTHER PUBLICATIONS

Lee, P.W. et al., "ASM Handbook, vol. 7: Powder Metal Technologies and Applications" p. 182-187, 1988.*

(Continued)

*Primary Examiner* — Mark Kopec
(74) *Attorney, Agent, or Firm* — Locke Lord LLP

(57) ABSTRACT

The present invention relates to a new method for preparing a silver-based electrical contact material, comprising following steps of: (a) providing a carbonaceous mesophase solution; (b) adding a silver source into the carbonaceous mesophase solution and stirring to obtain a compound; (c) removing a solvent from the compound to obtain a solid; (d) performing a heat treatment on the solid, and obtaining a silver-based electrical contact material. The silver source is silver powder prepared by means of a chemical method. By means of the method, a uniform carbonaceous coating on silver is implemented, the silver is uniformly distributed in a nanometer scale, and a diamond is generated in situ of a material after being sintered. The silver-based electrical contact material processed by means of this method shows an excellent mechanical wear resistance and electrical property.

9 Claims, 6 Drawing Sheets

(51) Int. Cl.
    *B22F 1/02*     (2006.01)
    *C22C 1/05*     (2006.01)
    *C22C 5/06*     (2006.01)
    *C22F 1/14*     (2006.01)
    *H01H 1/023*     (2006.01)
    *H01H 1/027*     (2006.01)
    *H01H 11/04*     (2006.01)
    *B22F 9/24*     (2006.01)

(52) U.S. Cl.
    CPC . *C22C 1/05* (2013.01); *C22C 5/06* (2013.01); *C22F 1/14* (2013.01); *H01B 1/02* (2013.01); *H01H 1/023* (2013.01); *H01H 1/027* (2013.01); *H01H 11/04* (2013.01); *B22F 2304/056* (2013.01); *B22F 2304/058* (2013.01); *B22F 2304/10* (2013.01); *B22F 2998/10* (2013.01); *H01H 11/048* (2013.01); *H01H 2300/036* (2013.01)

(56) References Cited

FOREIGN PATENT DOCUMENTS

| | | |
|---|---|---|
| CN | 1552926 | 12/2004 |
| CN | 101654746 | 2/2010 |
| JP | 2002-53919 | 2/2002 |

OTHER PUBLICATIONS

English Language Translation of PCT Written Opinion of the International Searching Authority for International Application No. PCT/CN2013/073513—Date of Mailing: Jul. 4, 2013, 5 pages.
English Language Machine Translation of Chinese Patent Application Publication No. CN101654746, 6 pages.
English Language Machine Translation of Chinese Patent Application Publication No. CN1396025, 4 pages.
English Language Machine Translation of Chinese Patent Application Publication No. CN1552926, 5 pages.
English Language Machine Translation of Japanese Patent Application Publication No. JP2002-53919, 17 pages.
International Search Report for International Application No. PCT/CN2013/073513, Date of Completion of Search: Jun. 14, 2013, 6 pages.
English Language Machine Translation of Chinese Patent Application Publication No. CN1421477—4 pages.
Extended European Search Report for European Patent Application No. 13768524.4—Dated Oct. 23, 2015, 6 pages.
English Language Machine Translation of Chinese Patent Application Publication No. CN1552926—5 pages.
English Language Machine Translation of Chinese Patent Application Publication No. CN101654746—6 pages.

* cited by examiner

Atomized silver powder 1000 times     Chemical silver powder 10000 times (a)     (b)

Atomized silver powder 2000 times     Chemical silver powder 40000 times (c)     (d)

METHOD FOR PREPARING SILVER-BASED ELECTRICAL CONTACT MATERIAL

TECHNICAL FIELD

The present invention relates to a novel method for preparing a silver-based electrical contact material.

BACKGROUND ART

Electrical contact materials, also known as materials used for electric contact materials or contacts or contactors or connectors, are the important components of apparatuses and instruments, such as high to low voltage electric switches. They are in charge of connecting and disconnecting a circuit while passing the electric current in the corresponding circuit.

In the current field of preparation of a silver-based electrical contact material, for example, in the preparation of a silver-carbon electrical contact material, generally silver powder and graphite powder are mixed homogenously by a dispersion method such as powder metallurgy or high energy ball milling, and then the mixed powder is subjected to isostatic pressing sintering, extrusion moulding, slicing and other process steps, thereby obtaining the desired contact material. However, during the treatment of powder, traditional methods of mixing powder, namely powder metallurgy and high energy ball milling, at most can achieve microscale homogenous mixing, and also often lead to inhomogeneous mixing accompanied with powder agglomeration and other phenomena. These factors seriously affect the mechanical and physical properties, electrical properties and other properties of a material obtained by sintering the powder. In addition to the above reason that the powder metallurgy or high energy ball milling process tends to cause inhomogeneous powder agglomeration, the process also tends to cause contamination of an electrical contact material with a ball milling medium because of a relatively long treatment time.

In addition, in order to improve the overall performance of an electrical contact material, a carbonaceous material can also be added to the electrical contact material. But, at present, it has been found that in such processes, carbon exhibits both poor coating and poor invasion with respect to the atomized silver powder, thereby seriously affecting the performance of a silver-based electrical contact material.

Among the above methods comprising the addition of carbonaceous materials, there are attempts to directly add a diamond to a silver-based electrical contact material, with a view to improving the wear resistance of the electrical contact material and thus extending the service life of the material. Although a diamond can optimize the mechanical properties of a silver-based electrical contact material, it also greatly increases the production cost of the material, so such methods are not feasible in actual production. Moreover, it is difficult to achieve uniform dispersion by adding a diamond using a powder metallurgy method.

In order to solve the above problems, the inventors have conducted in-depth and meticulous researches, and have solved the above problems using the technical solution of the present invention.

DISCLOSURE OF THE INVENTION

The method for preparing a silver-based electrical contact material according to the present invention comprises the following steps:

(a) providing a carbonaceous mesophase solution;
(b) adding a silver source to the carbonaceous mesophase solution under stirring to obtain a mixture;
(c) removing a solvent from the mixture, thereby obtaining a solid; and
(d) subjecting the solid to a heat treatment, thereby obtaining a silver-based electrical contact material,
wherein the silver source is silver powder prepared by a chemical method (i.e., chemical silver powder).

By means of the method, a uniform carbonaceous coating on silver is achieved, the silver is uniformly dispersed in a nanometer scale, and a diamond is generated in situ of a material after being sintered. The electrical contact material thus obtained shows excellent mechanical wear resistance and electrical properties.

BRIEF DESCRIPTION OF THE DRAWINGS

FIGS. 6 (a) to (d) are the Raman spectra of a silver-carbon composite body, wherein FIG. 6(a) shows a silver-carbon composite powder sample prepared in the absence of a catalyst, and FIGS. 6(b), 6(c) and 6(d) show the silver-carbon composite body samples respectively prepared by using a carbonaceous mesophase solution of a cobalt-, iron- or nickel-containing catalyst at different concentrations.

EMBODIMENTS

Figure 1:
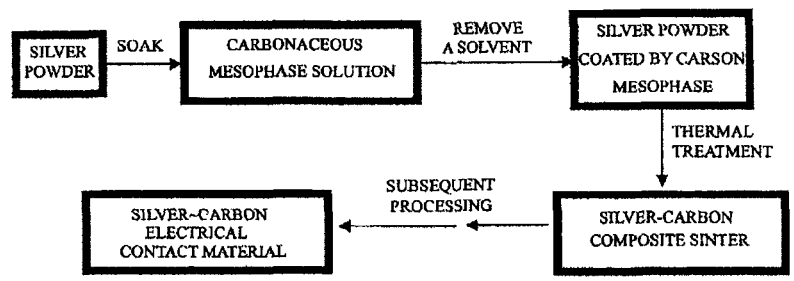
FIG. 1 is a schematic flow diagram showing the basic process route of the method according to the present invention.

The present invention provides a method for preparing a silver-based electrical contact material, comprising the following steps:

(a) providing a carbonaceous mesophase solution;
(b) adding a silver source to the carbonaceous mesophase solution under stirring to obtain a mixture;
(c) removing a solvent from the mixture to obtain a solid; and
(d) subjecting the solid to a heat treatment to obtain a silver-based electrical contact material.

The method for preparing a silver-based electrical contact material according to the present invention and the characteristics thereof will be described in detail hereinafter with reference to the specific process.

(1) Carbonaceous Mesophase Solution

The carbonaceous mesophase solution provided as a raw material in the method according to the present invention provides the carbonaceous material of an electrical contact material. Such carbonaceous mesophase solution is prepared by dissolving a carbonaceous mesophase in a suitable solvent.

The term "carbonaceous mesophase" as used in the art generally refers to a nematic liquid crystal substance generated during the heat treatment of a heavy aromatic hydrocarbon substance. One of the important features of carbonaceous mesophase is optical anisotropy. A carbonaceous mesophase is a high-quality precursor for the preparation of a high-performance carbon material product.

Carbonaceous mesophases include, for example, mesophase pitch-based carbon fibers (a pitch-based carbon fiber mesophase), mesophase carbon fiber microspheres (a carbon fiber microsphere mesophase) and the like. They are mainly obtained from coal pitch or petroleum pitch as the raw material.

Carbonaceous mesophases also include the carbonaceous mesophases prepared from biomass resources as the raw material, namely the carbonaceous mesophases derived from biomass. Regarding the biomass-derived carbonaceous mesophases and the corresponding preparation methods, please see, for example, the patent application CN 1421477A, which is incorporated by reference herein in its entirety. Biomass-derived carbonaceous mesophases have advantages due to their ready availability, renewability, cleanability and low cost.

There is no particular limitation to the carbonaceous mesophase used in the method of the present invention. However, a biomass-derived carbonaceous mesophase is preferred in consideration of environmental protection and production cost.

The carbonaceous mesophase solution used in the present invention is obtained by dissolving the above-mentioned carbonaceous mesophase in a suitable solvent. In one embodiment of the method according to the present invention, the concentration of the carbonaceous mesophase solution is 0.005 to 6% by weight. Preferably, the concentration of the carbonaceous mesophase solution may be 0.005 to 5% by weight, e.g. 0.01 to 4% by weight or 0.5 to 4% by weight. In the method according to the present invention, the carbonaceous content of the silver-based electrical contact material can be regulated and controlled by regulating the concentration of the carbonaceous mesophase solution. A person skilled in the art can regulate the concentration of a carbonaceous mesophase solution according to the need.

In the present invention, there is no particular limitation to the solvent which dissolves the carbonaceous mesophase to form a solution, except that the solvent can form a solution with the desired concentration and can be easily removed at a later stage. Preferred are environmentally friendly solvents, including alcohols, such as methanol, ethanol, propanol and the like, in particular ethanol.

(2) Silver Source

The silver source used in the preparation of an electrical contact material is preferably silver powder (or silver particles).

In a traditional process for the preparation of a silver-based electrical contact material, for example, in a traditional process for mixing powder by powder metallurgy or high energy ball milling, silver powder having a particle size in a certain range is used as the silver source. However, in the prior art there is no study on the type of the silver source used.

According to the present invention, chemical silver powder is particularly used as the silver source for the preparation of a silver-based electrical contact material.

The term "chemical silver powder" as used in the art refers to the silver powder prepared by a chemical method (e.g. a method of solution chemistry), and particularly refers to the (elemental) silver powder prepared by reducing a precursor of silver (a silver salt) in a solution. Common chemical methods include a silver-ammonium reduction method and so on.

The particle size of the chemical silver powder used in the method of the present invention may range from 100 nm to 100 μm, e.g. from 1 μm to 100 μm. The chemical silver powder used in the present invention can be purchased from the market.

(3) Mixing of a Silver Source and a Carbonaceous Mesophase Solution

The mixing of a silver source and a carbonaceous mesophase solution can be accomplished by adding silver powder, in particular chemical silver powder, to the carbonaceous mesophase solution, preferably by completely immersing the powder in the solution. After the addition of the silver source to the carbonaceous mesophase solution, they are stirred thoroughly to obtain a solid-liquid mixture of the silver powder and the carbonaceous mesophase solution, wherein a uniformly dispersed silver powder is contained.

In general, it is required that the silver powder be fully immersed in the carbonaceous mesophase in the step of adding the silver powder to the carbonaceous mesophase solution. Preferably, the silver powder is immersed in the carbonaceous mesophase solution for a certain period of time, so as to promote the uniform dispersion of the silver powder and the carbonaceous mesophase and the combination (coating) of the silver powder with the carbonaceous mesophase, and to improve the contact property (or invasion) of the carbonaceous mesophase with respect to the silver powder. The concentration of the carbonaceous mesophase solution is adjusted as required to change the distribution (coating) amount of the carbonaceous mesophase in the silver powder.

According to the present invention, the coating amount of carbon is improved as a result of the use of chemical silver powder. For example, in the case of a silver-carbon composite powder which is not heat treated, the coating amount of carbon with respect to silver can vary in the range of, for example, from 0.01 wt. % to 1.5 wt. %, particularly from 0.04 wt. % to 1.3 wt. %, more particularly from 0.05 wt. % to 1.2 wt. % (based on the total weight of silver-carbon), when the concentration of the carbonaceous mesophase is from 0.01 to 1% by weight.

The coating amount of carbon with respect to silver in a heat treated (e.g. sintered) silver-carbon composite body can vary in the range of, for example, from 0.01 wt. % to 1 wt. %, particularly from 0.02 wt. % to 0.5 wt. %, more particularly from 0.02 wt. % to 0.3% wt. % (based on the total weight of the silver-carbon), when the concentration of the carbonaceous mesophase is from 0.01 to 1% by weight.

(4) Removal of Solvent

After the silver powder and the carbonaceous mesophase are mixed thoroughly, the solvent in the solid-liquid mixture is removed. In the method of the present invention, there is no particular limitation to the method of removing the solvent from the above solid-liquid mixture. Any method of solvent removal that is widely known by those skilled in the art, e.g. drying, rotary evaporation or nitrogen purging, can be used. A solid in which a carbonaceous mesophase is uniformly coated with silver powder is thus obtained.

The coating of the carbonaceous mesophase with respect to silver, obtained in the method according to the present invention, is controllable by regulating the concentration of the carbonaceous mesophase solution.

(5) Heat Treatment

After removal of the solvent, the resulting solid is subjected to a heat treatment, whereby a silver-based electrical contact material can be obtained.

The heat treatment step is preferably performed in a hydrogen-containing atmosphere. The atmosphere may be pure hydrogen atmosphere, or a gas mixture of hydrogen and nitrogen (such as an ammonia decomposition gas), or may be a gas mixture of hydrogen and ammonia, and the like.

According to the present invention, the heat treatment step is preferably sintering.

The heat treatment, such as sintering, may be performed at a temperature in the range of from 600° C. to 950° C., for example, preferably from about 650° C. to 800° C.

There is no particular limitation to the duration of heat treatment. In general, the heat treatment time which is too long will result in a cost which is too high; if the heat treatment time is too short, e.g., less than 0.5 hours, the sintering may not be fully carried out. Therefore, the heat treatment time is generally 1 to 10 hours, for example, may be 2 to 9 hours, 3 to 8 hours, or 1 to 3 hours, 6 to 10 hours or the like. It is apparent to those of ordinary skills in the art that the above numerical points can be recombined into new numerical ranges.

In a preferred embodiment of the present invention, the heat treatment is performed in a pure hydrogen atmosphere at 600 to 950° C. for 1 to 10 hours.

In another preferred embodiment, the heat treatment, such as sintering, is carried out in an atmosphere containing ammonia gas and hydrogen gas.

After the above heat treatment step, a sintered body in which a carbonaceous dispersed phase and silver are compounded uniformly is obtained. The nanoscale dispersion of carbon is achieved in a sintered body thus obtained.

In the silver-based electrical contact material, the silver acts as a continuous phase, and the carbon is dispersed, as a (micro)nanoscale dispersed phase, in the silver continuous phase.

Moreover, in the silver-based electrical contact material, in addition to the carbon in the form of graphite, carbon in the form of diamond is also generated in situ, preferably in a controllable manner.

In the sintered body of the silver-based electrical contact material, the amount of the dispersed carbon (carbonaceous dispersed phase) (including the carbon in the forms of graphite and diamond) may be regulated according to the need. The amount is preferably 0.02 to 5% by weight, based on the total weight of the carbonaceous dispersed phase. Preferably, carbon in the form of diamond is present in an amount of from 0.01 to 0.5% by weight in the entire carbonaceous dispersed phase.

By means of the method according to the present invention, carbon in the form of diamond can be generated in situ after sintering, with or without the use of a catalyst. The use of a catalyst is conducive to promoting the stable, in situ generation of carbon in the form of diamond. Thus, in some preferred embodiments of the method of the present invention, catalysts, in particular iron salts, cobalt salts or nickel salts, are preferably used. Preferred is an iron salt, such as iron nitrate or iron chloride.

(6) Catalyst

In the method of the present invention, a catalyst may also be used. Such catalyst may a salt capable of providing a metal ion, such as an iron ion, a nickel ion or a cobalt ion, preferably a salt capable of providing an iron ion. Preferred is an iron salt, cobalt salt or nickel salt that is soluble in a carbonaceous mesophase solution, i.e. a soluble iron salt, cobalt salt or nickel salt. Not limited by theories, the catalyst is complexed with the carbonaceous mesophase and the silver source, thereby catalyzing the reaction.

Preferably, the iron salt is ferric nitrate, ferric chloride, or ferric sulfate; the cobalt salt is cobalt nitrate, cobalt chloride, or cobalt sulfate; and the nickel salt is nickel nitrate, nickel chloride, or nickel sulfate.

The catalyst may be added in the step of providing a carbonaceous mesophase solution, or added in the step of mixing a silver source with a carbonaceous mesophase solution. In one embodiment of the present invention, in the step of preparing a carbonaceous mesophase solution, a salt which provides a metal ion is added to a carbonaceous mesophase solution. In another embodiment, a catalyst is added only during the mixing of a silver source, such as chemical silver powder, and a carbonaceous mesophase solution.

The salt may be added in various forms, for example, in the form of a solid salt (i.e. free of a solvent) or in the form of a solution (i.e. dissolved in a solvent), as long as the desired final concentration can be achieved. When the salt is added in the form of a solution, a solvent which is the same as the solvent contained in a carbonaceous mesophase solution is preferably used, e.g. ethanol. However, a different solvent may also be used, as long as it does not significantly affect the function of the catalyst.

The catalyst may be removed by a conventional technique in the subsequent step, or may be retained in the product, as required.

In a preferred embodiment, the catalyst is a soluble salt of an iron ion, cobalt ion or nickel ion.

In a preferred embodiment, the catalyst is a salt, in particular a soluble salt, of an iron ion, such as ferric nitrate or ferric chloride.

In the method of the present invention, the catalyst may be added or not added. In an advantageous embodiment, the above catalyst is added.

(7) Silver-Based Electrical Contact Material

The present invention also provides a silver-based electrical contact material, of which silver acts as a continuous phase and carbon is dispersed, as a dispersed phase, in the silver continuous phase. In the silver-based electrical contact material, the amount of the carbonaceous dispersed phase is 0.02 to 5% by weight, based on the total weight of the silver-based electrical contact material. Preferably, the carbon is dispersed in a (micro)nanometer scale in the silver continuous phase. The (micro)nanoscale dispersion of carbon means that more than 50% by weight of the carbon is in a nanometer scale, preferably more than 60% by weight of the carbon is in a nanometer scale, more preferably more than 70% by weight of the carbon is in a nanometer scale. And, the nanometer scale is in the range of from 1 to 1000 nm.

The carbonaceous dispersed phase of the silver-based electrical contact material comprises both the carbon in the form of graphite and the carbon in the form of diamond. According to the present invention, the carbon in the form of diamond is generated in situ by subjecting the carbonaceous mesophase to a heat treatment (e.g., sintering). In a preferred embodiment, the carbon in the form of diamond is present in an amount of from 0.01 to 0.5% by weight in the carbonaceous dispersed phase, based on the total weight of the carbonaceous dispersed phase.

Concerning a silver-based electrical contact material obtained by the above method, the coating property of a carbonaceous dispersed phase with respect to a silver continuous phase is very excellent.

The material is optionally subjected to a subsequent processing, that is, can be used as the final electrical contact material in a variety of electrical equipment, for example, for a low voltage or in a low voltage circuit breaker.

For example, the material can be processed in various ways, such as extrusion, drawing, molding slicing and the like, as required. A person skilled in the art can also choose other conventional technical means to process the sintered body according to the need of a specific application.

In one embodiment, the electrical contact material thus produced may be welded to contact walls for use as the dynamic and static contacts of a circuit breaker or a contactor for connecting and disconnecting a circuit while carrying the electric current in the corresponding circuit.

Hereinafter, the present invention is further explained and illustrated by the specific examples. It should be understood that the present invention is not limited to the embodiments described above and the following specific examples, but should be understood as the scope as claimed in the claims. Unless otherwise indicated, all the numerical points, ranges and percentages as used herein are based on weights.

EXAMPLES

Example 1

Provision of Carbonaceous Mesophase Solution

The carbonaceous mesophase can be obtained by a known method. The biomass-derived carbonaceous mesophase powder used in the present invention is obtained from Shandong Qufu Tianbojing Carbon Technology Co., Ltd.

The carbonaceous mesophase solution is formulated by the following method:

The biomass-derived carbonaceous mesophase powder was placed in ethanol and dissolved therein under stirring, followed by standing, thereby obtaining a carbonaceous mesophase solution. The concentration of the solution is determined by drying, and an appropriate amount of a solvent was added according to the determination result for dilution so as to obtain a carbonaceous mesophase solution with a concentration of 4%. An appropriate amount of a solvent was weighed and added. After thorough stirring, a series of ethanol solutions of carbonaceous mesophases were obtained. The concentrations of the carbonaceous mesophases were 0.4 wt. %, 0.04 wt. %, and 1 wt. %, 0.1 wt. % and 0.01 wt. %, respectively. They would be used in the subsequent step.

Silver Source

Chemical silver powder is used in the method according to the present invention. What is used in the Comparative Example is atomized silver powder, namely the ultra-fine silver powder formed after silver in the molten state is impacted by a high-speed air or liquid flow, dispersed and then cooled.

Both the chemical silver powder and the atomized silver powder used in the present invention were purchased. The chemical silver powder, with such a size that the sizes in at least two dimensions are less than 50 microns, was provided by Wenzhou Hongfeng Electrical Alloy Company Limited.

Example 2

Preparation of the Solid-Liquid Mixture

The chemical silver powder and the atomized silver powder were respectively immersed in the ethanol solutions of carbonaceous mesophases at different concentrations that were prepared in Example 1. After they were thoroughly mixed, ethanol was removed by evaporation, thereby obtaining a silver-carbon composite body. The concentrations of the carbonaceous mesophase solutions used in this example are shown in Table 1.

The coating amounts (wt. %) of carbon with respect to silver, which were obtained when the atomized silver powder and the chemical silver powder were impregnated with carbonaceous mesophase solutions with different concentrations, were analyzed by EDX qualitative analysis. The results are shown in Table 1 below.

TABLE 1

Comparison between the impregnation coating amount of a carbonaceous mesophase solution with respect to the atomized silver powder and the impregnation coating amount of a carbonaceous mesophase solution with respect to the chemical silver powder, as analyzed by EDX qualitative analysis

| Type of silver powder | Atomized silver powder | | | Chemical silver powder | | |
|---|---|---|---|---|---|---|
| Concentration of carbonaceous mesophase solution | 4% | 0.4% | 0.04% | 4% | 0.4% | 0.04% |
| Silver-carbon composite body (wt. %) | C 1.44 Ag 98.56 | 0.94 99.06 | 1.23 98.77 | 2.67 97.33 | 1.93 98.07 | 1.57 98.43 |

As can be clearly seen from the results of the EDX analysis as shown in Table 1, on the condition that carbonaceous mesophase solutions with concentrations ranging from 4% to 0.04% are used for impregnation, all the silver-carbon composite bodies obtained comprise carbon (C), i.e. all the solutions with different concentrations can form a carbonaceous coating on the surface of silver powder. However, on the condition that carbonaceous mesophase solutions with the same concentration are used, the coating amount of a carbonaceous mesophase with respect to the chemical silver powder is obviously greater than the coating amount with respect to the atomized silver powder.

Further, the coating amounts of carbonaceous mesophase solutions with different concentrations with respect to the atomized silver powder and the chemical silver powder after impregnation were accurately quantitatively analyzed by a C/S elemental analyzer, and the results are shown in Table 2.

TABLE 2

The coating amounts (carbon contents) of carbonaceous mesophase solutions with respect to the atomized silver powder and the chemical silver powder after impregnation, as analyzed by a C/S elemental analyzer

| Type of silver powder | Atomized silver powder | | | Chemical silver powder | | |
|---|---|---|---|---|---|---|
| Concentration of carbonaceous mesophase solution | 1% | 0.1% | 0.01% | 1% | 0.1% | 0.01% |
| Carbon content of a silver-carbon composite body before sintering (wt. %) | 0.08369 | 0.02855 | 0.02213 | 1.01952 | 0.15061 | 0.05544 |
| Carbon content of a sintered | — | — | — | 0.23 | 0.05 | 0.02 |

TABLE 2-continued

The coating amounts (carbon contents) of carbonaceous mesophase solutions with respect to the atomized silver powder and the chemical silver powder after impregnation, as analyzed by a C/S elemental analyzer

| Type of silver powder | Atomized silver powder | Chemical silver powder |
|---|---|---|
| silver-carbon composite body (wt. %) | | |

The results shown in Table 2 further confirm that on the condition that carbonaceous mesophase solutions with the same concentration are used, the coating amount of a carbonaceous mesophase with respect to the chemical silver powder is obviously greater than the coating amount with respect to the atomized silver powder. The reason may be that the chemical silver powder has a particular structure and generally has a lot of polar groups on its surface, whereby the chemical silver powder has an obviously better capacity to adsorb a carbonaceous mesophase than the atomized silver powder. Thus, the carbonaceous mesophase can be more invasive on the surface of the silver powder, thereby forming a better coating.

Figure 2:
FIGS. 2 (a) to (d) show the comparisons between the coating morphology of chemical silver powder and the coating morphology of atomized silver powder after they are impregnated with a carbonaceous mesophase solution.
Figure 2:
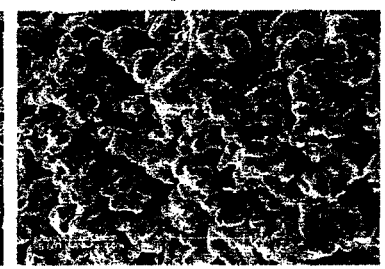
Figure 2:
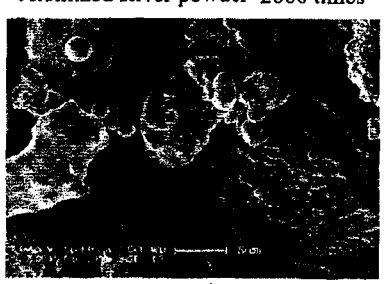
Figure 2:

FIG. 2 shows the morphologies of silver-carbon composite bodies obtained by separately impregnating the atomized silver powder and the chemical silver powder with a carbonaceous mesophase solution with a concentration of 4% by weight. FIGS. 2(a) and 2(c) are the morphologies of the silver-carbon composite body prepared from the atomized silver powder at 1000× or 2000× magnification, and FIGS. 2(b) and 2(d) are the morphologies of the silver-carbon composite body prepared from the chemical silver powder at 10000× or 40000× magnification.

As can be seen from FIG. 2, particle agglomeration occurs in the case of the atomized silver powder, whereas in the case of chemical silver powder, the particles have a smaller particle size, are more uniform in size, and allow the silver powder to be more invasive to the carbonaceous mesophase.

The results of Example 2 show that the method for preparing a silver-carbon electrical contact material using chemical silver powder according to the present invention is superior to the traditional methods using the atomized silver powder. It is already known that the use of the atomized silver powder generally leads to the microscale dispersion of silver-carbon, while agglomeration often occurs, thereby imposing negative impacts on the final properties (such as mechanical and physical properties and electrical properties) of an electrical contact material prepared by sintering. However, under the condition of using chemical silver powder, it is possible to disperse carbon in a nanometer scale, the opportunities for agglomeration to occur are effectively reduced, and those are obviously advantageous to the final performance of the electrical contact material.

Example 3

In this example, the silver-carbon composite powder was prepared by a method as described below:
Chemical silver powder coated with a carbonaceous mesophase on the surface thereof was prepared using carbonaceous mesophase solutions with different concentrations (1 wt. %, 0.1 wt. % and 0.01 wt. %). The chemical silver powder was placed in a crucible, sintered in a hydrogen atmosphere at 750° C., and incubated for 1 hour. With the cooling of the furnace, silver-carbon composite powder was obtained.

The carbon content of the silver-carbon composite powder obtained by the above heat treatment (sintering) is shown in the last row of Table 2. This table shows that carbonaceous mesophase solutions with concentrations in the range of from 0.01 to 1% can achieve a carbon content ranging from about 0.02 to 0.23 wt. %. Different coating amounts of carbonaceous mesophase can be achieved by regulating the concentrations of the solutions of carbonaceous mesophase, based on the data.

Figure 3:
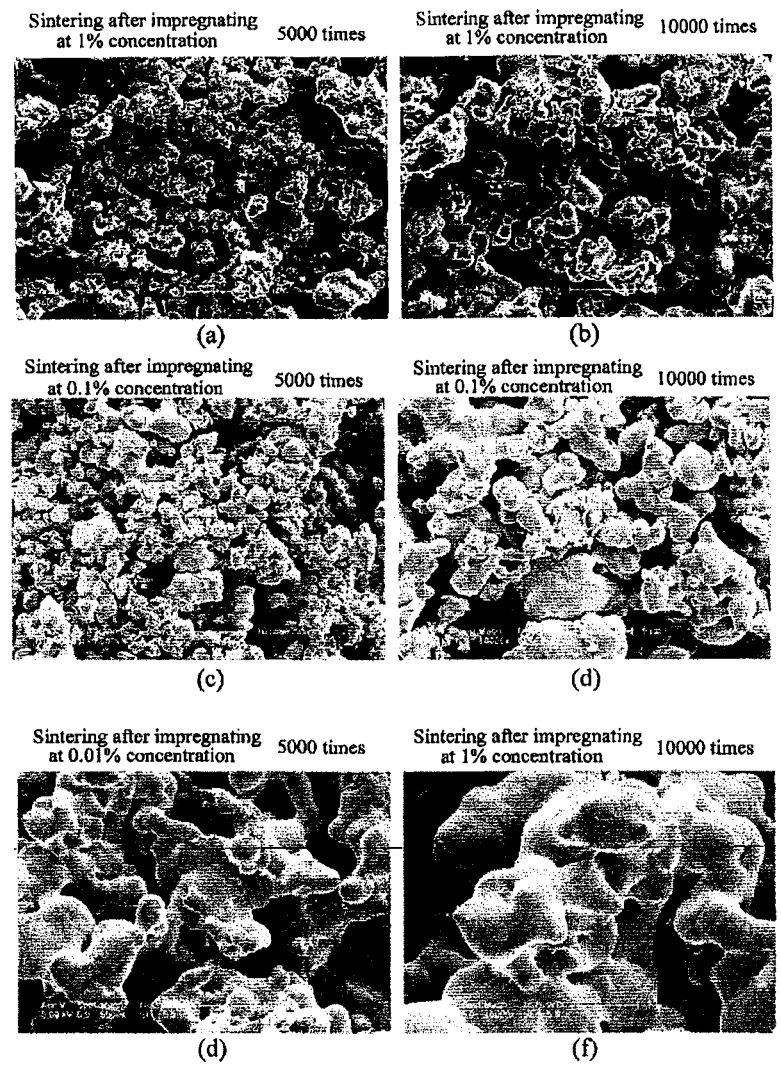
FIGS. 3 (a) to (f) are the SEM photographs showing the dispersion of carbon in a silver-carbon composite powder, wherein FIGS. 3(a) and 3(b) relate to a composite powder impregnated with a 1% carbonaceous mesophase solution, FIGS. 3(c) and 3(d) relate to a composite powder impregnated with a 0.1% carbonaceous mesophase solution, and FIGS. 3(e) and 3(f) relate to a composite powder impregnated with a 0.01% carbonaceous mesophase solution.

FIG. 3 is a photograph showing the dispersion of carbon in the above silver-carbon composite powder, as observed at different magnifications by means of SEM. As shown in the figure, no obvious two-phase separation can be observed from all the silver-carbon composite powder prepared using different concentrations of carbonaceous mesophase.

Figure 4:
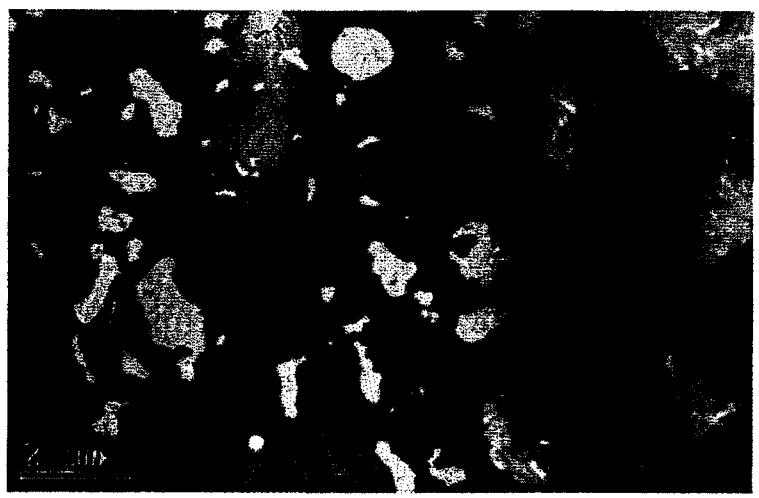
FIG. 4 is a TEM image of a heat treated (sintered) silver-carbon composite body, and shows that carbon is dispersed in silver in a nanometer scale.

The TEM image of FIG. 4 shows a sintered silver-carbon composite body, wherein the white part is carbon and the black part is silver. As can be seen from the figure, most of the carbon has a particle size in a nanometer scale, and the carbon dispersed in a nanometer scale does not aggregate.

Figure 5:
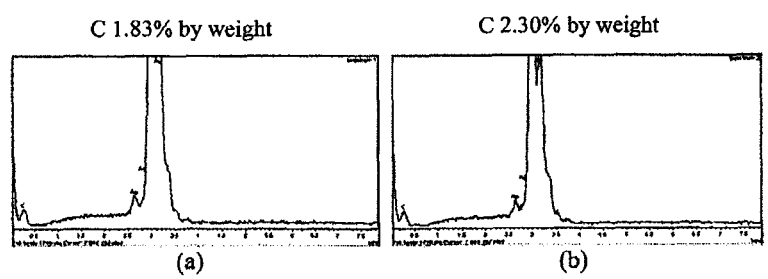
FIGS. 5 (a) to (b) are the EDX spectra showing the distribution of carbon in a silver-carbon composite powder, wherein (a) and (b) are at different positions of the powder.

FIG. 5 shows the distribution of carbon in the silver-carbon composite powder prepared using a carbonaceous mesophase solution with a concentration of 0.1%, as analyzed by an EDX analysis. As shown in the figure, the carbon contents at different positions of the sample are very close, and more specifically, they are 1.86 wt. % and 2.30 wt. %, respectively. This demonstrates an essentially uniform distribution of carbon in the silver-carbon composite powder.

Example 4

In this example, the preparation process is substantially the same as the process described in Example 3, except that the carbonaceous mesophase solution used in this example is a carbonaceous mesophase solution incorporated with a catalyst. The concentration of the catalyst is the concentration of a metal element in ethanol, namely 1%.

Figure 6:
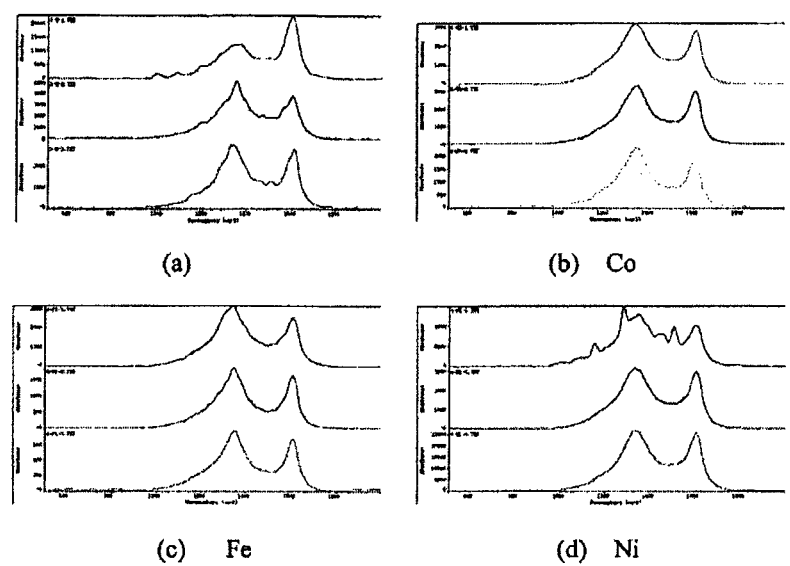

The forms of carbon of the silver-carbon composite bodies prepared in Examples 3 and 4 were analyzed by Raman spectroscopic analysis. The results of spectra are shown in FIG. 6. FIG. 6(a) shows a silver-carbon composite powder sample prepared by the method described in Example 3, and FIGS. 6(b), 6(c) and 6(d) show the silver-carbon composite body samples respectively prepared by using a nitrate of cobalt, iron or nickel as described in Example 4.

After a comparison, it has been found that without the use of a catalyst (see FIG. 6(a), Example 3), the proportion of the graphite form in the obtained powder sample is larger, and as the concentration of carbonaceous mesophase increases, the proportion of graphite becomes much larger, but no obvious diamond form can be observed.

In FIG. 6(b), FIG. 6(c) and FIG. 6(d), i.e. in the case that a cobalt ion, an iron ion and a nickel ion are respectively used as the catalyst, an increase in the amount of carbon in the form of diamond can be observed (i.e. there is an increase in the number of $sp^3$ peaks). In particular in the case of an iron ion used as the catalyst, as the amount of iron increases, not only the number of $sp^3$ peaks increases, but also the peak shape and quantity become very good.

The above examples fully confirm that not only carbon in the form of graphite are formed but also carbon in the form of diamond are obtained in the sintered body prepared by the method of the present invention, and therefore in the finally obtained silver-carbon composite electrical contact material. Moreover, the carbon in the form of diamond is directly formed in situ by sintering a carbonaceous mesophase coating during the heat treatment. Thus, the strength and the mechanical wear resistance of the silver-carbon composite body (sintered body) will be improved to a great extent due to the presence of carbon in the form of diamond. Compared with conventional methods comprising the direct addition of a diamond, it is evident that the method of the present invention greatly reduces the production cost.

It can also be appreciated that the amount of the diamond finally obtained can be regulated by appropriately regulating, for example, the sintering temperature, the amount of the silver powder added and the like, within the scope of the method of the present invention, so as to achieve the finally desired mechanical wear resistance.

By means of the preparation method of the present invention, powder can be uniformly dispersed in a nanometer scale, and carbon in the form of diamond is introduced in situ and thus imparts excellent mechanical properties. Furthermore, since graphite and diamond have the same function and they can be conveniently generated in situ using an ethanol solution of a carbonaceous mesophase catalyzed by a metal ion, the method of the present invention is a simple process, is easy to operate, does not cause any external contamination, and reduces costs.

The invention claimed is:

1. A method for preparing a silver-based electrical contact material, comprising the following steps:
   (a) providing a carbonaceous mesophase solution;
   (b) adding a silver source to the carbonaceous mesophase solution under stirring to obtain a mixture;
   (c) removing a solvent from the mixture to obtain a solid; and
   (d) subjecting the solid to a heat treatment to obtain a silver-based electrical contact material,
   wherein the silver source is silver powder prepared by a chemical method; and wherein carbon in the form of diamond is generated in the electrical contact material.

2. The method according to claim 1, wherein the silver powder has a particle size in the range of from 100 nm to 100 µm.

3. The method according to claim 1, wherein the carbonaceous mesophase comprises biomass-derived carbonaceous mesophase.

4. The method according to claim 1, wherein the concentration of the carbonaceous mesophase solution is 0.005 to 6% by weight.

5. The method according to claim 1, comprising a step of adding a catalyst to the carbonaceous mesophase solution during step (a), step (b) or both.

6. The method according to claim 5, wherein the catalyst is selected from the group consisting of: iron salts, cobalt salts and nickel salts.

7. The method according to claim 1, wherein the heat treatment is sintering.

8. The method according to claim 7, wherein the sintering is performed in a hydrogen-containing atmosphere.

9. The method according to claim 7, wherein the sintering is performed at a temperature in the range of from 600° C. to 950° C.

* * * * *